(No Model.)
E. HUTCHINSON.
SPRING FOR SIDE BAR VEHICLES.
No. 379,787. Patented Mar. 20, 1888.
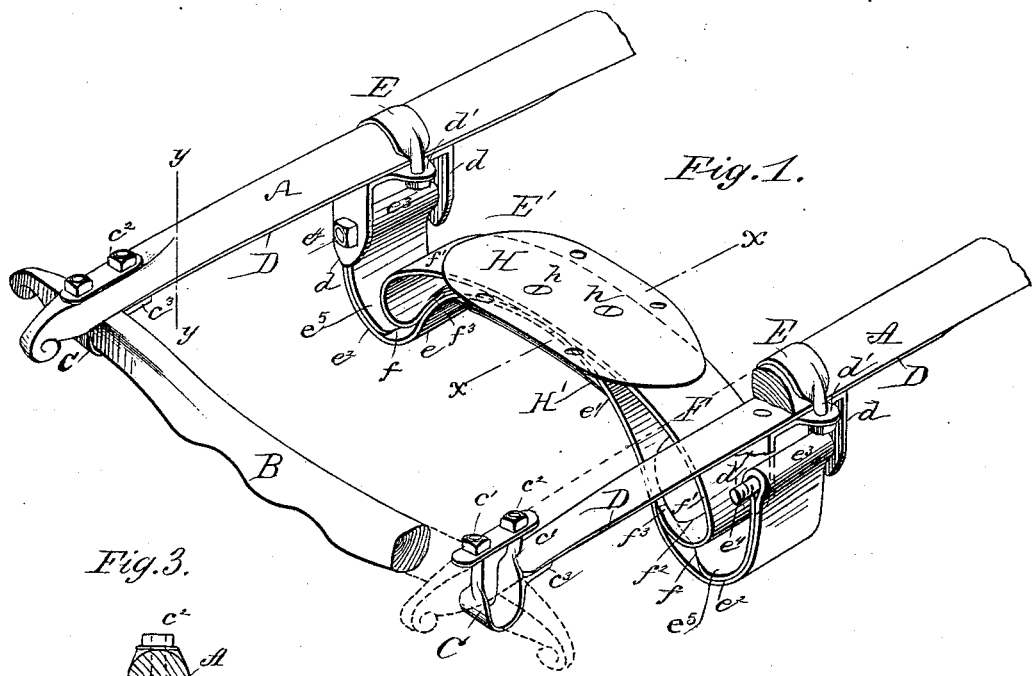
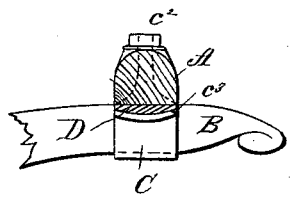
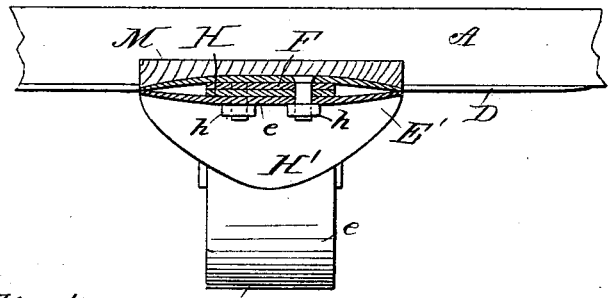
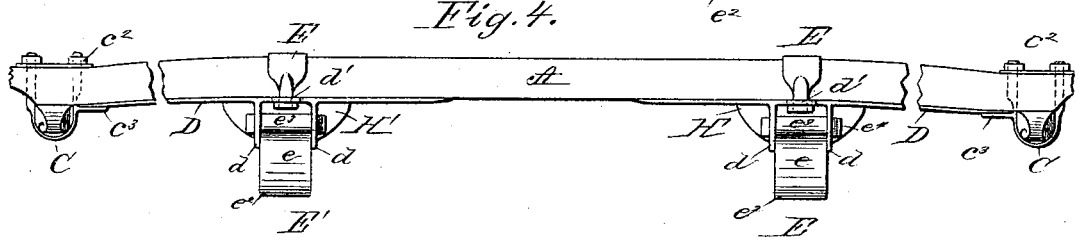
WITNESSES:
John M. Reemer
C. Sedgwick
INVENTOR:
E. Hutchinson
BY Munn & Co
ATTORNEYS.

UNITED STATES PATENT OFFICE.

EDWARD HUTCHINSON, OF NEW YORK, N. Y.

SPRING FOR SIDE-BAR VEHICLES.

SPECIFICATION forming part of Letters Patent No. 379,787, dated March 20, 1888.

Application filed November 5, 1887. Serial No. 254,358. (No model.)

*To all whom it may concern:*

Be it known that I, EDWARD HUTCHINSON, of the city, county, and State of New York, have invented a new and Improved Spring for Side-Bar Vehicles, of which the following is a full, clear, and exact description.

My invention relates to an improved platform-spring for side-bar wagons, and has for its object to provide a spring of peculiar construction readily attached to the platform of a vehicle and to the side bars, and wherein the spring will impart to the body a regular, easy, and pleasing movement; and the further object of the invention is to provide a means of strengthening and supporting the side bars, wherein they will at all times and under all conditions keep their shape, and wherein the said bars may be made light and graceful, yet retain all the strength of the ordinary weighty bars.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a perspective view of one spring and a section of the side and front bars. Fig. 2 is a transverse section on line $x$ $x$ of Fig. 1. Fig. 3 is a section on line $y$ $y$ of Fig. 1, and Fig. 4 is a side elevation of the side bars having the springs attached.

In carrying out the invention, A represents the side bars, and B the front bar, of a vehicle, the rear bar being similar in construction and similarly united to the side bars. The front, end, and side bars are united by a clip, C, which clip, embracing the front and end bars, has its members $c'$ passed upward through the side bars, being secured in position by suitable nuts, $c^2$, as illustrated in Fig. 1. The clips C are of peculiar construction, inasmuch as each one is provided with a horizontal lip, $c^3$, integral with the outer surface of the inner member, the said lip having an upper concave surface, as illustrated in Fig. 3. The purpose of the said lip upon the end clips, C, is to sustain the outer ends of horizontal springs D, two of which springs, conforming to the contour of the under surface of the side bars, being provided for each bar, extending, respectively, from a bearing upon the lips $c^3$, in contact with the side bars, to a point near the center thereof. These springs D not only impart additional elasticity to the side bars, but strengthen them, whereby they may be made lighter; and the said spring-bars also act in the important capacity of stays, retaining the side bars in perfect shape and effectively preventing sagging at any point in their length.

As the springs D are made of thin steel and fit snugly to the side bars, their presence is hardly discernible. Therefore they detract nothing from the graceful contour of the side bars. The springs may be held throughout their length in engagement with the side bars by rivets, bolts, or other suitable or equivalent devices.

At each side of the center of the two side bars ears $d$ are secured or held longitudinally in connection with the under side of the spring-bars D, or formed integral therewith, which ears are provided with aligning transverse and central outwardly-extending lugs, $d'$, through which lugs the members of an intermediate clip, E, are passed, said clips embracing the upper surface of the side bars, as shown in Figs. 1 and 4, being retained in position by means of the usual nuts screwed upon the extremities of the members.

The springs proper, E', consist, first, of a leaf, $e$, provided with a bow, $e'$, having the convex side upward, and the ends bent or curved upwardly upon themselves, as shown at $e^2$, to form an eye, $e^3$, through which eye, and also through the ears $d$, a bolt, $e^4$, is passed, as shown in Figs. 1 and 4, retained in position in the ordinary manner. The overlapping ends $e^5$ of the leaf $e$ are made to conform to the contour of the curve $e^2$ and to the rise of the bow $e'$, being at this point reduced in width, as shown in Fig. 1, and provided with aligning edge recesses $f$. A second similarly-curved leaf, F, of a length slightly greater than the actual bow of the leaf $e$, is placed upon the upper side of the latter leaf, having its ends $f'$ bent inward toward each other, and a segmental recess, $f^2$, produced in the transverse edges, whereby fingers $f^3$ are formed, which fingers overlap and ride upon the reduced folded extremities of the leaf e above the recesses f therein.

About centrally the two leaves e and F aligning apertures are provided, and upon the top of the upper leaf, F, is placed an oval binding-plate, H, apertured in like manner to the said leaves, which plate, while conforming to the contour of the leaf F from a point near the ends centrally, is made to project outward at each side from the said leaf. A second and shorter binding-plate, H', similarly curved, although of the same width and similarly apertured to the upper plate, H, is made to bear centrally against the under surface of the leaf e, and the two binding-plates and the leaves are held in close and firm contact by the passage of bolts h through the central apertures aforesaid, as illustrated in Fig. 2. Thus in central cross-section the two binding-plates constitute an ellipse, centrally between the walls of which, in contact therewith and with each other, the upper and lower leaves of the spring D are held.

The body of the vehicle is connected with the spring through the medium of a block, M, having its under face concaved to correspond with the convexity of the upper plate, the said block, which is secured to the vehicle-body, being attached to the springs, preferably, by four or more bolts passing through apertures in the overhanging sides of the binding-plates.

When weight is brought to bear upon the springs, the two leaves work in opposite directions, the under leaf being flexed inward, the outer leaf flexing outward and riding upon the under leaf. It will be observed that the spring action of the leaves takes place at and near the ends only, the central portion being bound by the elliptical plates.

The attachment of the body to a spring of this character is easily and expeditiously accomplished, and the motion imparted thereby to the vehicle-body is regular and pleasant.

Having thus fully described my invention, I claim as new and desire to secure by Letters Patent—

1. The combination, with the side bars of a vehicle, of a clip attached thereto, provided with a lip integral with and extending outwardly from one member, having a concave upper surface, and a spring-bar held by said lip longitudinally in contact with the under side of the side bars, substantially as shown and described.

2. The combination, with the side bars of a vehicle, of transverse springs consisting of an under leaf centrally and upwardly bowed and having upwardly-curved ends pivoted to the side bars, an upper leaf similarly bowed having inwardly-bent extremities riding upon the lower leaf, plates fitted to the contour of the upper and lower leaves centrally the same, and bolts passing through said leaves and plates, substantially as shown and described, whereby the leaves work in opposite directions, one upon the other, at their ends only, as set forth.

3. The combination, with the side bars of a vehicle, of transverse springs consisting of an under leaf centrally and upwardly bowed having its ends upwardly curved and bent upon themselves, its overlapping extremities being provided with aligning edge recesses, the said leaf being hinged at its ends to the side bars, an upper leaf similarly bowed having inwardly-bent extremities resting upon the overlapping ends of the lower leaf and provided with a transverse segmental recess in said extremities, oval plates fitted to the upper and lower contour of the leaves, and bolts passing through said leaves and plates, substantially as and for the purpose herein set forth.

4. The combination, with the side bars, A, and cross-bars B of a vehicle, of a clip attached to the side bars, the body of the clip adapted to receive the bar B and provided with a laterally-projecting lip integral with one member, and a spring-bar held by said lip in contact with the under surface of said side bars, substantially as shown and described.

5. The combination, with the side bars of a vehicle, of the spring-bars D, held in aligning contact with their under face, having downwardly-extending apertured lugs or ears d, and the horizontally-apertured lugs d', extending transversely to the lugs d, said lugs d d' formed integral with the spring-bars D, substantially as and for the purposes specified.

6. The combination, with the side bars of a vehicle having their spring-bars D held in contact with their under face longitudinally the same, said bars extending from the outer ends and terminating at each side of the center of said side bars, and provided with transverse horizontal lugs d', adapted to receive the arms of clip E, and having downwardly-extending apertured lugs d, of transverse springs having upwardly-curved ends pivoted in said lugs d, substantially as shown and described.

EDWARD HUTCHINSON.

Witnesses:
J. F. ACKER, Jr.,
C. SEDGWICK.